US007719685B2

(12) United States Patent
Li

(10) Patent No.: US 7,719,685 B2
(45) Date of Patent: May 18, 2010

(54) NEAR-FIELD OPTICAL APPARATUS AND METHOD USING PHOTODETECTOR ARRAY

(76) Inventor: Chian Chiu Li, 1847 Bristol Bay CMN, San Jose, CA (US) 95131

( * ) Notice: Subject to any disclaimer, the term of this patent is extended or adjusted under 35 U.S.C. 154(b) by 243 days.

(21) Appl. No.: 11/946,885

(22) Filed: Nov. 29, 2007

(65) Prior Publication Data

US 2008/0144029 A1    Jun. 19, 2008

Related U.S. Application Data

(60) Provisional application No. 60/867,795, filed on Nov. 30, 2006.

(51) Int. Cl.
*G01N 21/64* (2006.01)
*G01J 3/51* (2006.01)
(52) U.S. Cl. .................... 356/416; 356/417; 356/419
(58) Field of Classification Search ............ 850/30, 850/31, 32; 977/850, 853, 860, 862
See application file for complete search history.

(56) References Cited

U.S. PATENT DOCUMENTS

| 4,604,520 | A |   | 8/1986  | Pohl |
| 5,933,233 | A | * | 8/1999  | Gunther ............... 356/318 |
| 5,969,345 | A |   | 10/1999 | Williams et al. |
| 6,156,215 | A |   | 12/2000 | Shimada et al. |
| 6,163,519 | A | * | 12/2000 | Kuroda et al. ......... 369/126 |
| 6,215,114 | B1| * | 4/2001  | Yagi et al. ............. 250/216 |
| 6,852,968 | B1|   | 2/2005  | Ouchi et al. |

* cited by examiner

*Primary Examiner*—F. L Evans

(57) ABSTRACT

An imaging-type near-field optical microscope mainly comprises a light source and a photodetector array. The array functions as imaging array where each cell or photodetector has subwavelength dimensions. A sample under test is disposed in optical near field of the photodetectors, e.g., on surface of the array. As a result of subwavelength dimensions and near-field effect, resolution can break the diffraction limit and even reach nanoscale. The microscope has a fast speed, works with soft sample and sample in solution, and is capable of dynamic observations. In addition, the array surface doubles as a platform for molecule manipulation.

20 Claims, 7 Drawing Sheets

Figure 7:
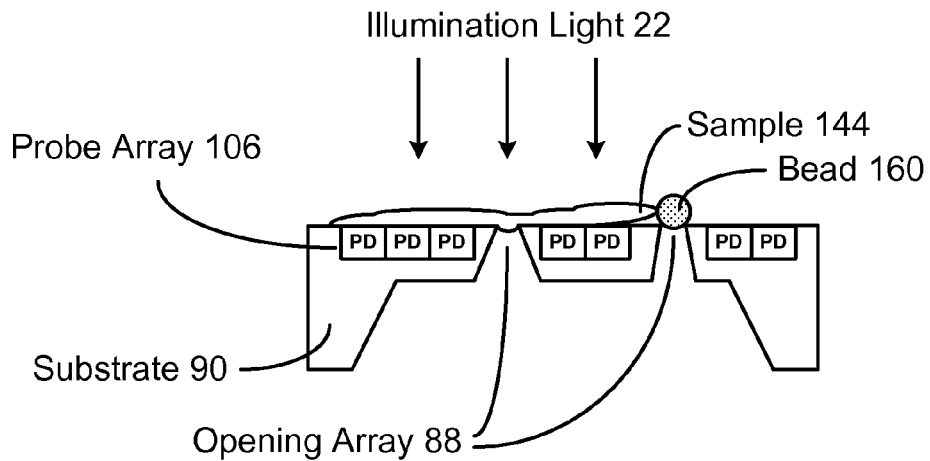

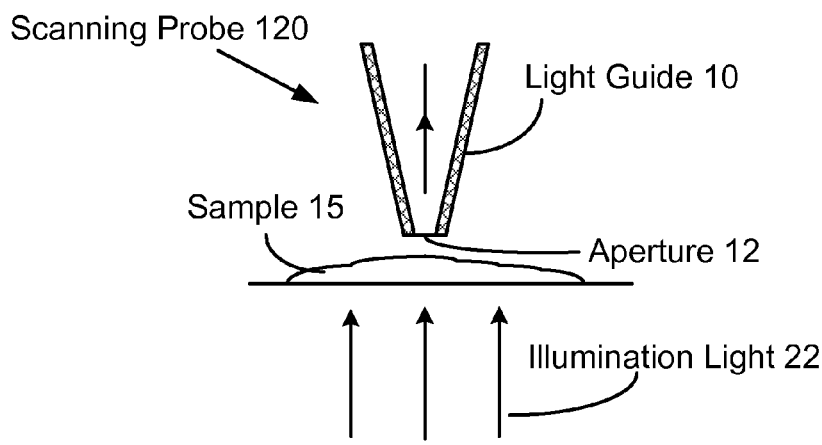
FIG. 1-A (Prior Art)
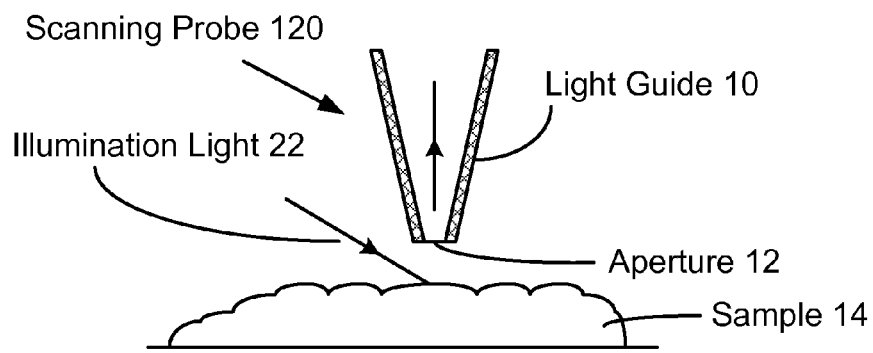
FIG. 1-B (Prior Art)
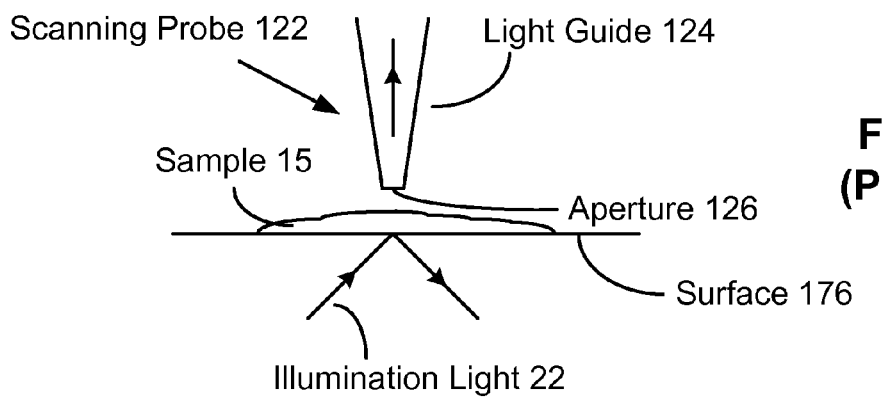
FIG. 1-C (Prior Art)

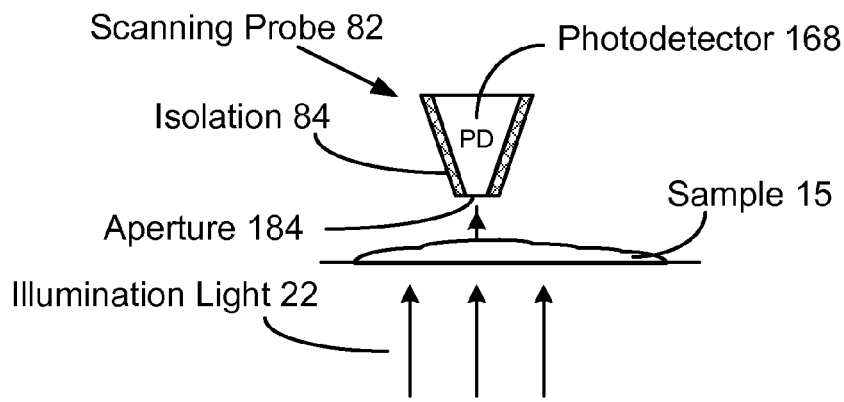
FIG. 1-D (Prior Art)
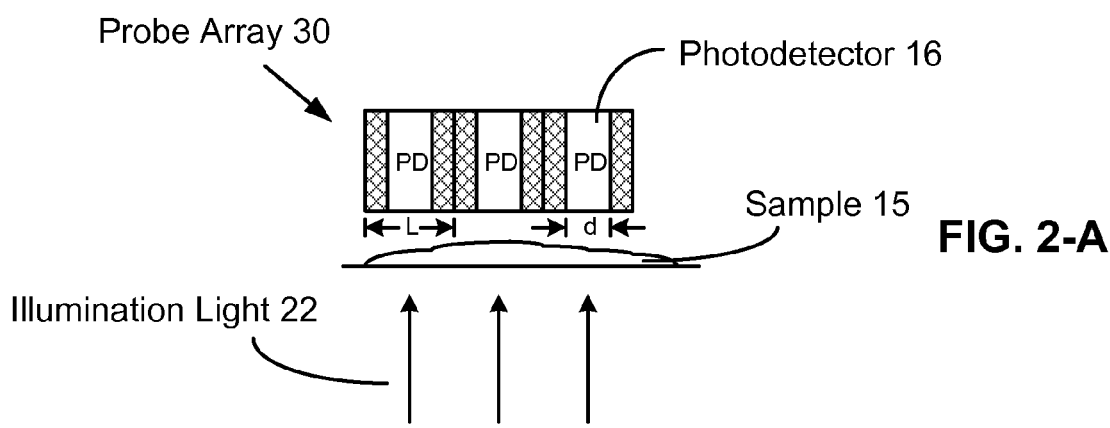
FIG. 2-A
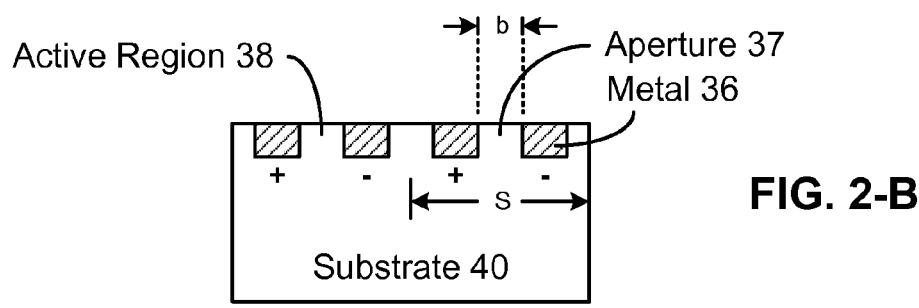
FIG. 2-B

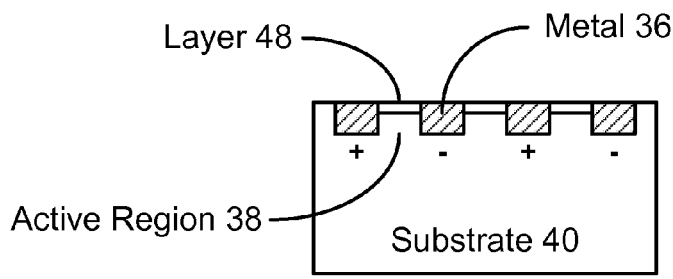
FIG. 2-C
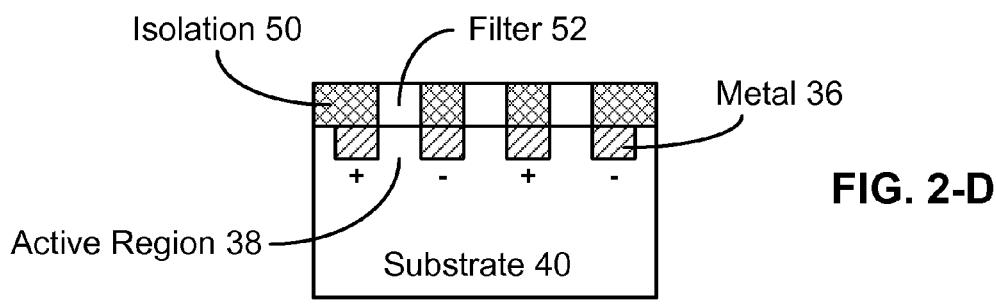
FIG. 2-D
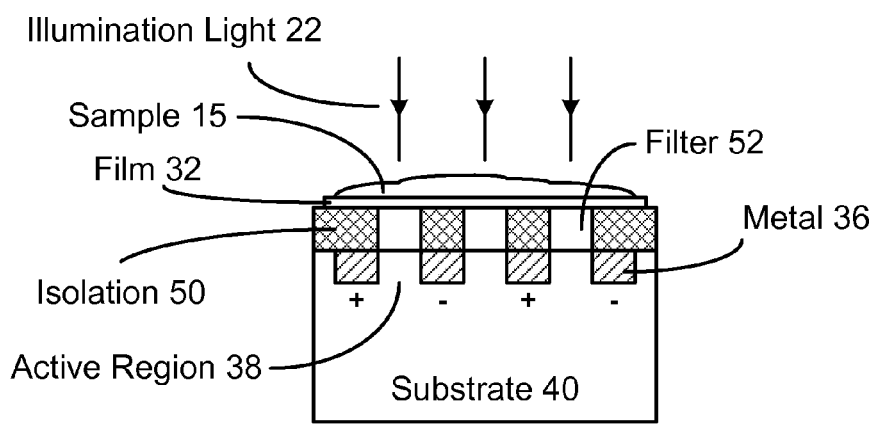
FIG. 2-E

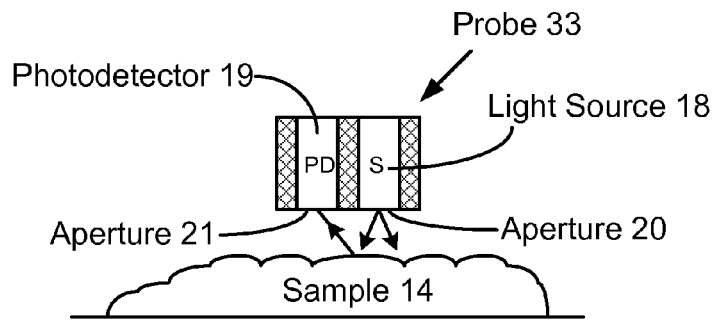
FIG. 3-A
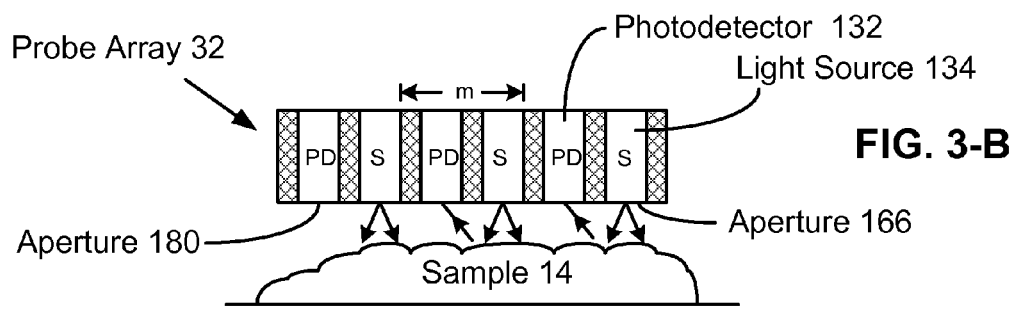
FIG. 3-B
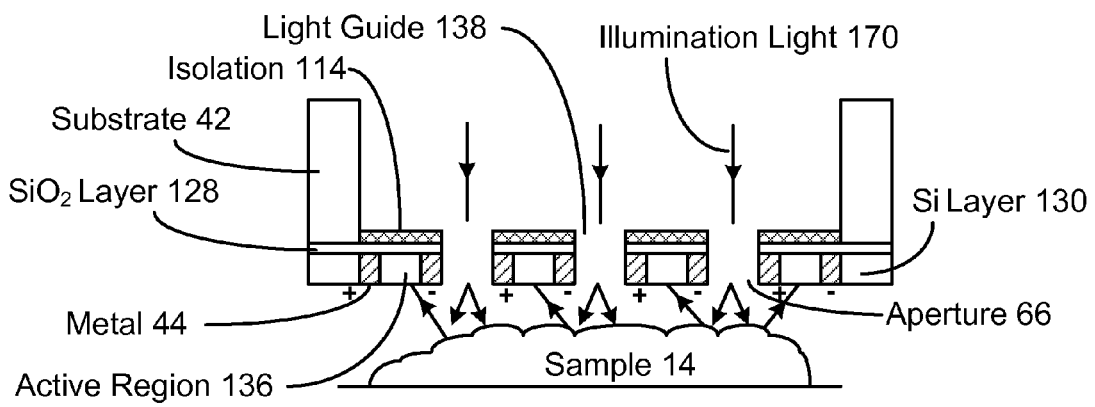
FIG. 3-C

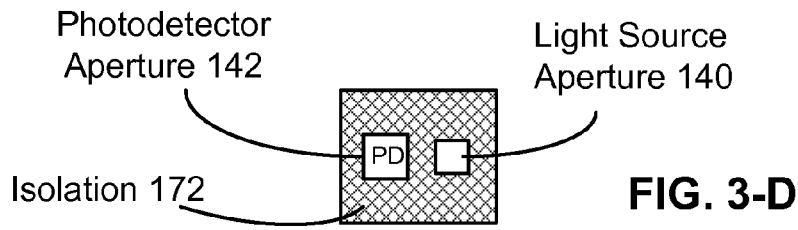
FIG. 3-D
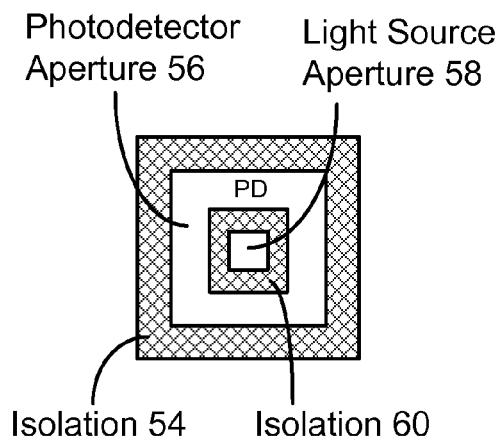
FIG. 3-E
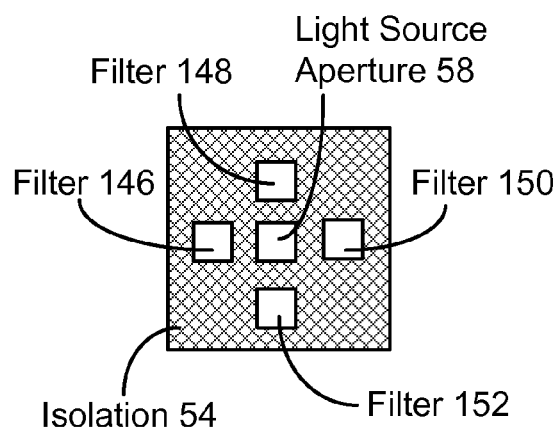
FIG. 3-F
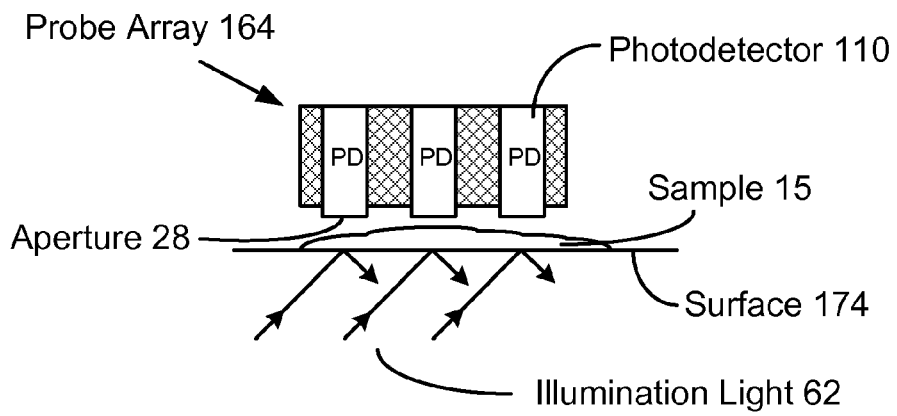
FIG. 4

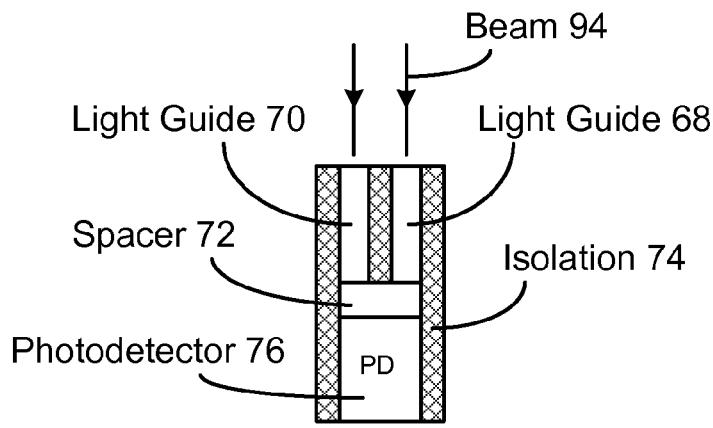
FIG. 5
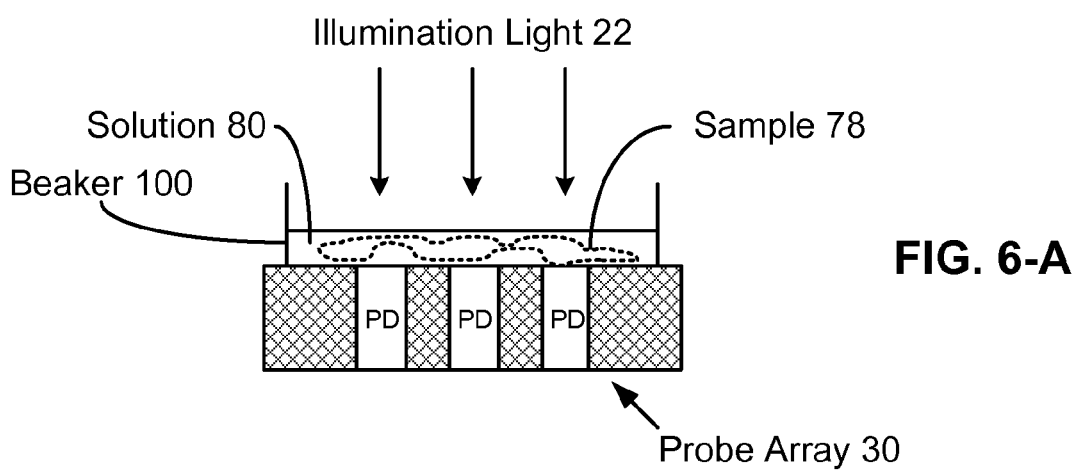
FIG. 6-A
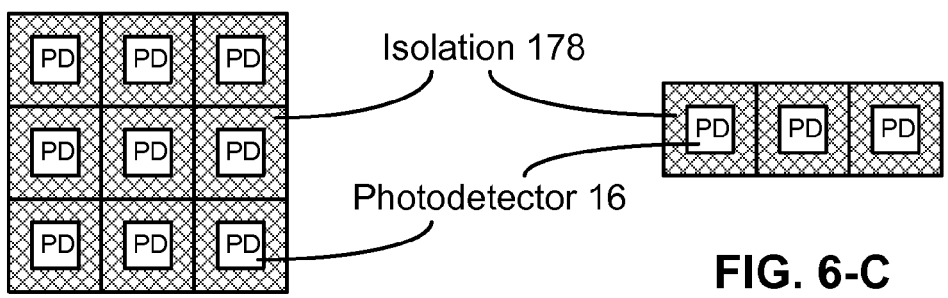
FIG. 6-B
FIG. 6-C

NEAR-FIELD OPTICAL APPARATUS AND METHOD USING PHOTODETECTOR ARRAY

CROSS REFERENCE TO RELATED APPLICATION

This application is entitled to the benefit of Provisional Patent Application Ser. No. 60/867,795, filed Nov. 30, 2006.

FEDERALLY SPONSORED RESEARCH

Not applicable

SEQUENCE LISTING OR PROGRAM

Not applicable

BACKGROUND

1. Field of Invention

This invention relates to optical microscopy, and particularly to near-field optical microscopy.

2. Description of Prior Art

Optical microscope is a well-known and widely used instrument. Due to the diffraction limit, its maximum resolution which we are able to get is about 200 nanometers. To observe finer details, other microscopes had been developed, for example, electron microscope, scanning tunneling microscope (STM), and atomic force microscope (AFM), all with sub-nanometer resolution. Electron microscope, STM, and AFM however, can't substitute optical microscope for many applications, especially in biomedical fields because, they lack ability of chemical and molecular identification. Near-field scanning optical microscope (NSOM) utilizes optical near-field effect to break the diffraction limit. It can reach resolution of 50 to 100 nanometers, or nanoscale, which is usually defined as below 100 nanometers. NSOM, on other hand, has its own drawbacks, which include slow imaging speed, operation complexity, and difficulties with soft sample, sample in solution, and dynamic observation. The weakness of NSOM has hampered its usefulness and application ever since it was first made more than twenty years ago.

Accordingly, there exists a need for an optical microscope in many fields, in particular biomedical fields, which breaks the diffraction limit, has a fast imaging speed, is easy to operate, works well with soft sample and sample in solution, and is capable of dynamic observations.

OBJECTS AND ADVANTAGES

Accordingly, several main objects and advantages of the present invention are:

a). to provide an improved near-field optical microscope (NOM);

b). to provide such a microscope whose resolution goes beyond the diffraction limit and even into nanoscale range;

c). to provide such a microscope which is of image type and has a fast imaging speed;

d). to provide such a microscope which is easy to operate and well handles soft and in-solution samples; and e). to provide such a microscope which is capable of dynamic observations.

Further objects and advantages will become apparent from a consideration of the drawings and ensuing description.

SUMMARY

In accordance with the present invention, a photodetector (PD) array is constructed for use as a NOM probe or near-field imaging array. Each PD is an imaging cell. The PDs have subwavelength dimensions and are spaced by a subwavelength distance. A sample is measured after being disposed in optical near field of the PD array. In one scheme, a sample is placed directly on a PD array surface. The resulting NOM is of imaging type with fast speed. Its resolution, related to imaging cell dimensions and spacing between neighboring cells, can break the diffraction limit and even reach nanoscale range. It works with soft sample and sample in solution and enables dynamic observations. The array surface can also be used as a platform to manipulate molecules.

ABBREVIATIONS

AR Anti-reflection
AFM Atomic force microscope
LED Light emitting diode
MSM PD Metal-semiconductor-metal photodetector
NOM Near-field optical microscope
NSOM Near-field scanning optical microscope
PD Photodetector
SoI Silicon-on-insulator
STM Scanning tunneling microscope

DRAWING FIGURES

FIGS. 1-A to 1-D illustrate schematically prior-art NSOM principles, respectively.

FIG. 2-A is a schematic cross-sectional view showing an embodiment of NOM having a PD array according to the invention.

FIGS. 2-B to 2-E are schematic cross-sectional views illustrating embodiments of NOM having a MSM PD array according to the invention, respectively.

FIGS. 3-A to 3-C are schematic cross-sectional views showing embodiments of NOM having a light source according to the invention, respectively.

FIGS. 3-D to 3-F are schematic diagrams showing probe unit embodiments of NOM probe array according to the invention, respectively.

FIG. 4 is a schematic cross-sectional view illustrating an embodiment of dark-field NOM utilizing evanescent waves according to the invention.

FIGS. 5 and 6-A to 6-C are schematic cross-sectional views showing respectively embodiments of NOM according to the invention.

Figure 8:
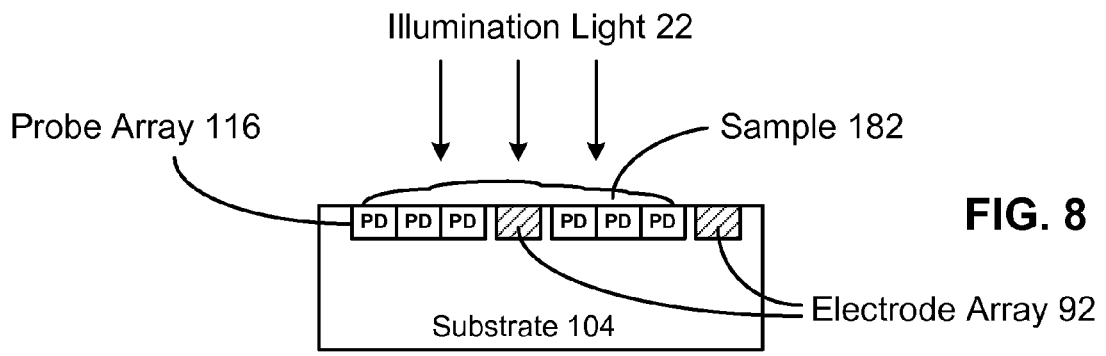
Figure 9:
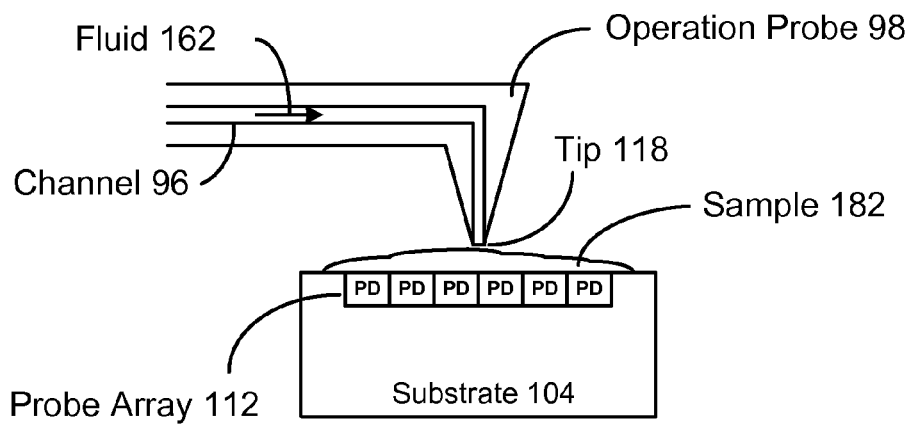

FIGS. 7 to 9 are schematic cross-sectional views illustrating respectively embodiments of NOM which have sample manipulation functions according to the invention.

REFERENCE NUMERALS IN DRAWINGS

| 10 | light guide | 12 | aperture |
|---|---|---|---|
| 14 | sample | 15 | sample |
| 16 | photodetector | 18 | light source |
| 19 | photodetector | 20 | aperture |
| 21 | aperture | 22 | illumination light |
| 28 | aperture | 30 | probe array |
| 32 | probe array | 33 | probe |
| 36 | metal | 37 | aperture |
| 38 | active region | 40 | substrate |
| 42 | substrate | 44 | metal |
| 48 | layer | 50 | isolation region |
| 52 | filter | 54 | isolation region |
| 56 | PD aperture | 58 | light source aperture |
| 60 | isolation region | 62 | illumination light |

-continued

| | | | |
|---|---|---|---|
| 66 | aperture | 68 | light guide |
| 70 | light guide | 72 | spacer |
| 74 | isolation region | 76 | photodetector |
| 78 | sample | 80 | solution |
| 82 | probe | 84 | isolation region |
| 88 | opening array | 90 | substrate |
| 92 | electrode array | 94 | beam |
| 96 | channel | 98 | operation probe |
| 100 | Beaker | 104 | substrate |
| 106 | probe array | 110 | photodetector |
| 112 | probe array | 114 | isolation region |
| 116 | probe array | 118 | probe tip |
| 120 | scanning probe | 122 | scanning probe |
| 124 | light guide | 126 | aperture |
| 128 | silicon dioxide layer | 130 | silicon layer |
| 132 | photodetector | 134 | light source |
| 136 | active region | 138 | light guide |
| 140 | light source aperture | 142 | PD aperture |
| 144 | sample | 146 | filter |
| 148 | filter | 150 | filter |
| 152 | filter | 160 | bead |
| 162 | fluid | 164 | probe array |
| 166 | aperture | 168 | photodetector |
| 170 | illumination light | 172 | isolation region |
| 174 | surface | 176 | surface |
| 178 | isolation region | 180 | aperture |
| 182 | molecular sample | 184 | aperture |

DETAILED DESCRIPTION

FIGS. 1-A to 1-D—Prior-Art

FIG. 1-A shows a prior-art NSOM of transmission-collection mode. A scanning probe 120 contains a tip-like light guide 10 which is coated with metal on its outside surface. A beam 22 as illumination light is transmitted to impinge onto a sample 15. An aperture 12 at the apex of light guide 10 collects light signals which emerge from the sample. The aperture has a subwavelength dimension and is positioned within subwavelength distance from sample 15 such that it receives near-field signals of the sample. To gain nanoscale resolution, the aperture dimensions and distance between the aperture and a sample are made to be in the deep subwavelength range, or nanoscale range. Signals collected through the aperture and light guide are sent to a detecting system. The light signals are then converted to electrical currents, amplified, and stored subsequently. Each time, one spot of the sample is measured. For a selected sample area, spots are scanned and data is taken respectively and orderly.

Usually sample scanning is implemented through three dimensional displacement of a probe by mature positioning and scanning mechanisms. First, a probe tip is positioned above a sample area. Next the probe is moved vertically until reaching optical near filed of the sample surface. Then illumination light is transmitted to the sample to start measurement. This process is repeated when the probe traverses to cover a sample area horizontally in two dimensions. After a designated region is finished, data are compiled electronically to generate a sample image. The positioning and scanning mechanism and its control system, however, are not shown in this and other drawings followed, since it is of mature technology and a well-known art. In all drawings related to NSOM, it is assumed a scanning probe is attached to a positioning and scanning system, although the positioning and scanning system are not depicted there.

FIG. 1-B is a diagram of a prior-art NSOM of reflection-collection mode. Aperture 12 of light guide 10 collects light signals in the optical near field of a sample 14. The signals are of illumination light which is reflected by sample 14.

FIG. 1-C shows a prior-art dark-field NSOM. Sample 15 sits on a substrate surface 176, by which illumination beam 22 is bounced by total internal reflection. A scanning probe 122 has an uncoated tip that works as a light guide 124. The tip disturbs total reflection conditions where it points at in the near field of surface 176, which causes a small portion of light 22 to go through the surface and part of sample 15. The small portion of light which leaks out belongs to evanescent waves. It becomes light signals carrying information of sample 15 after leaving the sample and is collected by light guide 124 through an aperture 126.

Unlike above NSOM examples, where light signals are gathered by a probe and transmitted to a remote photo detecting system through light guide, another prior-art NSOM of transmission-collection mode, as shown in FIG. 1-D, has a PD which is built within the probe. In a cross-sectional view in FIG. 1-D, a scanning probe 82 has a Schottky PD 168 and an isolation region 84 around the outer side surface. The PD receives light through a subwavelength aperture 184.

In above prior-art examples, light signals carry the same wavelength as the illumination light. For fluorescence imaging, however, light signals are of fluorescence photons, whose wavelength is different from, usually smaller than, the excitation light, i.e., the illumination light. So a fluorescence filter is often used that lets pass of the fluorescent light and blocks the excitation light. Because a fluorescence filter separates excitation light form signal light, background noise is reduced and signal-to-noise ratio is increased greatly. The filter may be placed on top of a PD. In examples and embodiments hereafter, it is assumed that schemes introduced are applicable to fluorescence imaging without mentioning it.

FIGS. 2-A to 2-E Embodiments of Near-Field Optical Microscope

Probe 82 in FIG. 1-D may be fabricated by currently available semiconductor technology, and a number of such probes can be integrated together to create a probe array. The array is utilized to overcome the weakness of NSOM while retaining NSOM's advantage—nanoscale resolving power. The result, an embodiment of NOM of transmission-collection mode, is depicted schematically in a cross-sectional view in FIG. 2-A. A probe array 30 comprises PD probes in two dimensions. The probes have a PD 16 with a subwavelength aperture dimension d. In addition, each probe has a subwavelength external dimension L on surface of the probe array. Furthermore, the probe surface is disposed close to sample 15 such that the probes receive near-field signals from the sample respectively. Since the probes each correspond to one spot of sample 15, signals acquired by array 30 lead to a 2-dimensional image directly.

Like NOSM, resolution of the NOM in FIG. 2-A is closely related to aperture dimensions. Subwavelength aperture dimension and probe dimension result in subwavelength resolution, while deep-subwavelength aperture dimension and probe dimension can result in nanoscale resolution. Nanoscale resolution can be achieved because PD 16 works as probe 82 in FIG. 1-D. When the two have similar aperture dimensions and dimension L is also small enough, they produce similar resolution under near-field conditions. From fabrication point of view, semiconductor devices having nanoscale feature size including photodetectors had been made long time ago and the technology is well-known in the art. Thus, there is no barrier to construct a PD array where feature size is of deep subwavelength. Therefore the NOM in FIG. 2-A, just like a NSOM, not only can break the diffraction limit, but also generate deep subwavelength resolution, or nanoscale resolution. In following discussions on molecule observation and manipulation, nanoscale resolution of a NOM is assumed without mention, because it is difficult to work on molecular level if nanoscale resolution is out of reach.

To ensure probe apertures are within near field of a sample area under investigation respectively, a sample surface is preferred to be relatively flat. The sample is also preferred to be thin to reduce background noise and increase signal power for the configuration of FIG. 2-A.

Because of direct imaging feature of the probe array, two-dimensional horizontal scan over a sample surface, which is required for NSOM, is no longer needed. Once probe array 30 is adjusted vertically by positioning means such that near-field conditions are satisfied, signals received by the probe array are processed electronically and a sample image is generated. Compared to scanning maneuvers of NSON, the direct imaging method yields much faster speed. With such imaging method, dynamic chemical and biological evolution and reaction, and molecule movement and interaction can be monitored in vivo.

FIG. 2-B shows schematically a cross-sectional view of yet another NOM probe array which is fabricated on a semiconductor substrate 40. The probe array is made up of metal-semiconductor-metal photodetector (MSM PD). As in the figure, a MSM PD contains two metal regions 36 and an active region 38. An active region is where incident light waves are absorbed and converted to electrical currents. The PD is biased via electrodes—the metal regions. Another function of the metal region is to help create an aperture 37. Both the aperture dimension b and PD dimension S are of subwavelength to ensure subwavelength image resolution and take advantage of benefits of the near-field effect. The metal region may be fabricated by etching a trench on the substrate and filling it with metal materials. Another way is to coat the trench with a thin metal layer for similar results. Substrate 40 can be made up of silicon, silicon germanium, gallium arsenide, indium gallium arsenide, or other semiconductor materials.

Active region 38 of FIG. 2-B may have a layer 48 grown on the top surface, as shown graphically in a cross-sectional view in FIG. 2-C. Layer 48 may be of a thin oxidation film for passivation purpose or specially designed anti-reflection (AR) thin film.

When a complex filter is needed for a PD, such as in fluorescence measurements where incident light of one wavelength is used to generate fluorescence at another wavelength, a multi-layer structure may be built above the top active region. FIG. 2-D illustrates schematically a NOM which has a MSM PD array and a fluorescence filter 52. Here a light blocking isolation region 50 is deposited on a metal region to define the aperture shape and dimensions. Filter 52 is among or between regions 50, and serves as a light guide besides functions of filter. Filter 52 may also be fabricated to function as polarizer, phase retarder, attenuator, etc.

FIG. 2-E shows schematically a cross-sectional view of a transmission-collection mode NOM in applications. The NOM has a similar MSM PD array to that of FIG. 2-D. Sample 15 is placed on a transparent membrane or thin film 32 which is arranged on the array surface. Assume that sample 15 is relatively flat and film 32 is relatively thin such that apertures of the PD array are within near field of the sample. This setup is particularly useful for certain biomedical samples including single molecule, because many biomedical samples are soft which make it relatively easy to get attached to a surface, satisfying the condition of optical near field. It also works for bio samples in solution. Take for example a single molecule of string type. The molecule may be long, but the string could be thin, from a few to tens of nanometers. Once the molecule string is untangled and attached on thin film 32, its near-field signals become available for the PD array instantly.

The NOM scheme in FIG. 2-E requires neither 2-dimensional horizontal scan, nor position adjustment in the vertical direction. Once a sample is disposed on the PD array surface, near-field images are taken directly. Therefore, the NOM can be used to view a sample conveniently, constant and continuously, and at a fast speed, which would enable dynamic observation of living cells, living molecules, and many biomedical processes.

FIGS. 3-A to 3-F Embodiments of Near-Field Optical Microscope

Referring to FIG. 3-A, a NSOM embodiment of reflection-collection mode is shown schematically in a cross-sectional view, where a PD 19 and a light source 18 form a NSOM probe 33. Illumination light is emitted to impinge onto sample 14 through an aperture 20 of light source 18, while the reflected light waves, the signals, are collected by PD 19 via an aperture 21. The embodiment may have various configurations. In one scheme, aperture 21 has subwavelength dimensions, and is arranged to receive near-field signals from a subwavelength-sized area of sample 14, while aperture 20 has no dimensional restriction. In another scheme, only aperture 20 needs to have subwavelength dimensions. Light from the subwavelength aperture illuminates a subwavelength-sized sample area and creates near-field signals from there. In yet another scheme, both apertures 20 and 21 have subwavelength dimensions.

Probe 33 has one feature—apertures of PD and light source are arranged together in one place—which is different from the prior-art NSOM. The light source may be of a semiconductor laser, light emitting diode (LED), or light guide. The PD and light source may be bonded or integrated together. NSOM with such a probe can be fabricated small and compact. Furthermore, it can be used as a base unit of probe array for yet another embodiment of NOM, which is of reflection-collection mode and where no external illumination light source is provided.

A NOM embodiment with a probe array, where a base unit resembles probe 33 of FIG. 3-A, is illustrated schematically in a cross-sectional view in FIG. 3-B. The reflection-collection mode NOM has a probe array 32. Each array unit comprises a PD 132 with an aperture 180 and a light source 134 with an aperture 166. Array 32 is preferred to be two dimensional such that it can conduct two-dimensional measurement directly without horizontal scanning. In order to gain subwavelength resolution, each base unit has an external dimension m smaller than wavelength of light signals, which also means apertures 166 and 180 are made subwavelength. Again, sample 14 is preferred to be relatively flat to satisfy near-field conditions required by the measurement.

In FIG. 3-C, graphically illustrated is another NOM embodiment of reflection-collection mode. The NOM is fabricated using a silicon-on-insulator (SOI) structure. A thin silicon layer 130 of the SOI is employed to make MSM PD. The MSM PD contains metal regions 44 and an active region 136. Region 136 also functions as an aperture for the PD. Beside and in close proximity of MSM PDs, there are light guides 138 through which part of illumination light 170 is transmitted. Light guide 138 with an aperture 66 is created by etching selectively a SOI substrate 42, a silicon dioxide layer 128, and silicon layer 130. Dimensions of the MSM PD, light guide, and spacing between two of them are chosen to be small enough to get subwavelength resolution. Because each MSM PD captures a subwavelength sample spot, the NOM generates a two-dimensional image at subwavelength resolution directly. To prevent light from going into MSM PD from the substrate direction, an isolation layer 114 is deposited on silicon dioxide layer 128. As discusses previously, sample 14 shall be placed proximate to the PD apertures and light guide apertures in order to satisfy the optical near-field condition during measurements.

The probe arrays in FIGS. 3-B and 3-C require only vertical displacement to access the near field of sample. Again, there is no need for 2-dimensional horizontal scanning. Therefore, imaging speed of this NOM embodiment is much faster than that of NSOM.

In addition, probe arrays in FIGS. 3-B and 3-C may be used in a manner similar to the one in FIG. 2-E, where a sample is arranged to lie on a probe array surface, or on a thin membrane which is attached to the array surface, to satisfy the near-field condition instantly and conveniently. Since vertical displacement is no longer required, imaging speed is improved further.

FIG. 3-D shows schematically a probe unit embodiment for probe array 32 of FIG. 3-B in a view looking against the light coming out of a source aperture 140. Assume the probe unit has a PD aperture 142. The two apertures are surrounded by an isolation region 172. As aforementioned, dimensions of the apertures and isolation region 172 are chosen such that aperture 142 receives signals from a subwavelength spot of the sample as a result of near-field effect.

Another probe unit embodiment for probe array 32 of FIG. 3-B is shown schematically in FIG. 3-E. Assume a PD and light source have apertures 56 and 58, respectively. The figure shows a view looking against the light coming out of aperture 58. In contrast to a side-by-side aperture arrangement in FIG. 3-D, PD aperture 56 is a band which surrounds light source aperture 58. The band-shaped PD increases aperture area, which in turn increases signal power. Around the apertures are isolation regions 54 and 60. Size of the apertures and spacing between apertures are small enough such that the whole dimension of the probe unit is subwavelength for the sake of subwavelength or even nanoscale measurements.

In many applications, spectral information of sample is desired, which is often used to identify chemical or biological properties. FIG. 3-F shows schematically a probe unit embodiment in a direction looking toward light source aperture 58 from the outside. Around aperture 58, there are four PDs which have filters 146, 148, 150, 152 respectively. The filters each carry a specific wavelength range for light to pass through. Together, measurement result of the PDs indicates spectral characteristics of light signal. Again, dimensions of the apertures and distance between them are small enough for subwavelength or even nanoscale resolution. Shape and number of filter can be varied to fit actual needs and conditions.

FIGS. 4, 5, 6-A to 6-C Embodiments of Near-Field Optical Microscope Referring to FIG. 4, an embodiment of dark-field NOM is illustrated schematically in a cross-sectional view. A probe array 164 consists of PDs 110. Each PD has an aperture 28 that is located on a protruded tip end of the detector. Sample 15 is placed on one side of a surface 174; while on the other side of the surface, illumination light 62 experiences total internal reflection. When probe array 164 is positioned close enough to surface 174 such that apertures 28 are in the near field of it, each protruded probe tip alters locally the condition of total internal reflection. The disrupted total internal reflection causes a small portion of illumination light 62 to leak out and pass through surface 174 and sample 15. The leaky waves, or evanescent waves, become light signals and reach the PDs respectively.

Because of the probe array, a two-dimensional image is acquired directly. Like other embodiments, subwavelength resolution of a dark-field NOM can be acquired with this setup. Again, there is no need for horizontal scanning, though vertical positioning is still involved.

As aforementioned, a filter might be used to reduce background noise or eliminate excitation light in fluorescence measurement for some applications. The filter allows passage of light within a wavelength range while blocking light of other wavelengths. Conventional thin film filters contain a number of layers to generate interference or multiple interferences to create filtering effect. Another way to make a filter is depicted graphically in a cross-sectional view in FIG. 5, where a probe embodiment for NOM probe array has two light guides 68 and 70 arranged behind an aperture.

Assume the aperture has dimensions smaller than wavelength of the light. Thus, the light guides have dimensions smaller than the wavelength in a direction perpendicular to light propagation as well. When an incident beam 94 is coupled into the light guides, it is divided into two beam portions by wavefront division. The light guides are designed to cause different phase retardation to the two portions. After emerging from the light guides and enter a spacer region 72, the portions spread and merge together by themselves and interfere occurs. The interferometric signals are then received by a PD 76. Because interference intensity is dependable on both phase difference and wavelength, for one phase difference, the interference is constructive at one wavelength, while destructive at another wavelength. Therefore, the interference structure in FIG. 5 works like a filter. In the figure, isolation regions 74 are arranged to separate the light guides and probe units.

A filter such as discussed above may also have interference structures that divide an incoming beam into more than two portions. Interference caused by more than two portions results in multi-wave interference and a narrower pass band, as is well-known in the field. The interference filter structure may be applied to other probe units discussed aforehead. Although a PD may be located relatively away from a sample when a filter is added, the optical near-field condition can still be satisfied when NOM apertures are disposed proximate to it.

The probe arrays may also be used to investigate biomedical samples in solution, as depicted graphically in a cross-sectional view in FIG. 6-A. A sample 78 in solution 80 is arranged in a beaker 100. The beaker, sitting on surface of probe array 30, has a relatively thin and transparent bottom, or has an opening aligned to probe array 30, provided sealing is in place around the opening. The thin beaker bottom or opening makes apertures of the probe array within the near field of sample 78.

In FIGS. 6-B and 6-C, exemplary two-dimensional and one-dimensional configurations of NOM probe array are illustrated in a cross-sectional view in a direction parallel to the array surface. The arrays comprise PDs 16 and isolation regions 178. The two-dimensional probe array of FIG. 6-B ensures direct image taking without the need of horizontal scanning, as compared to the demand of NSOM. The one-dimensional array of FIG. 6-C, on the other hand, requires only one-axis horizontal scanning, which also has advantages over NSOM in terms of scan speed and mechanism. Again, the base probes each have dimensions at least smaller than the wavelength in order to obtain a subwavelength two-dimensional image.

FIGS. 7 to 9 Single Molecule Manipulation

NOM probe array structures, for example, those depicted in FIGS. 2-E and 6-A, may be used as a platform to manipulate a single molecule because, the molecule can be fixed in a pre-arranged place and monitored constantly and continuously. In other words, once a molecule is disposed proximate to a probe array surface, details of physical distribution of the molecule with respect to the surface coordinates become known. Therefore, the surface can be utilized to pinpoint a molecule, hold it in place, and work on it. Any movement or displacement of the molecule as a result of manipulation or other effects can be found immediately, and measures may be taken in time.

FIG. 7 shows schematically an embodiment of single molecule manipulation in a cross sectional view. A NOM comprises a PD probe array 106 and an opening array 88. A molecular sample 144 is arranged on the probe array surface. Opening array 88 is scattered among and around PD array 106. The openings may be used to hold a sample by suction. For example, part of sample 144 can be sucked slightly toward an opening; or when sample 144 is attached chemically with an object, such as a bead 160, the bead can be pulled to an opening and held there by suction. Once one or a few points of a molecule are fixed, the molecule is fastened.

Therefore when sample 144 is placed in on the surface of probe array 106, it can be held there by opening array 88. After that, various forces can be exerted to sample 144 to manipulate it. For example, if one point of a molecule is fixed, another point on the opposite side can be utilized to stretch and twist the molecule. Some molecules are long and tangled, so a way to stretch and unwind them is very important. To make use of monitoring function of NOM, stretching and unwinding process may be carried out while the molecule is laid down horizontally and close to the array surface. Consequently, the progress can be watched and checked in vivo. Compared with bulk silicon, SOI better suits the needs, because SOI has a silicon dioxide layer sandwiched between two silicon layers, which can be used as an etch stop to etch away the substrate layer.

Another embodiment of single molecule manipulation is shown graphically in a cross-sectional view in FIG. 8. A PD probe array 116 of a NOM is fabricated on a substrate 104. A molecular sample 182 is disposed on the array surface. Again, being different from the NOM cases aforementioned, an electrode array 92 is introduced and built among and around the PD array. The electrodes may be made by depositing conductive materials on the array surface, or by etching the surface first to create a trench, and then filling it by conductive materials. Functions of the electrodes include implementing dielectrophoresis principles to move or hold a sample. Because of NOM monitoring advantages, detailed two-dimensional distribution of sample 182 on the array surface is known. Thus it is convenient to activate the electrodes selectively to reposition a molecule.

Yet another embodiment of single molecule manipulation is depicted graphically in FIG. 9, where sample 182 is arranged to be on the surface of a probe array 112. Assume sample 182 is fastened on the array surface and its location is known. Then an operation probe 98 can be brought in. Probe 98 may be a probe of a S™, AFM, NSOM, MEMS actuated device having a sharp end, etc. A tip 118 of the probe can be aimed at a desired spot of sample 182 with high precision. Probe 98 can have an internal channel 96 that leads to tip 118. Fluid 162 carried by the channel may be injected into sample 182 through tip 118 to cause biochemical reactions. The tip can also do pull, push, stretch, or twist to the sample. For example, channel 96 may be used to hold part of sample 182 by suction. If a magnetic bead is attached to sample 182, tip 118 may be designed to handle the sample by grasping the bead through magnetic force.

Moreover, the opening array scheme in FIG. 7, the electrode array scheme in FIG. 8, and the operation probe scheme in FIG. 9 can be combined to fasten a single molecule and manipulate it. Other methods include adding a microscope, especially a confocal microscope, or optical tweezers to the platform. A microscope has a larger field of view than NOM and may be helpful to handle a sample. Optical tweezers are of another manipulation tool, which hold and move a small sample by focused optical beam.

CONCLUSION, RAMIFICATIONS, AND SCOPE

Thus it can be seen that I have employed PD probe array to provide a NOM device.

The PD-array based NOM has the following advantages:

The ability to break the diffraction limit and even achieve deep subwavelength or nanoscale resolution, like NSOM does.

The ability to achieve mentioned resolution with a fast speed through imaging scheme.

The ability to perform dynamic measurement on soft sample and sample in solution.

The ability to double as a platform for single molecule manipulation.

Although the description above contains many specificities, these should not be construed as limiting the scope of the invention but as merely providing illustrations of some of the presently preferred embodiments. Numerous modifications, alternations, and variations will be obvious to those skilled in the art.

For example, aperture shape of PD and light source is not restricted to one type. They can be of square, circular, oval, rectangular, or even irregular form.

For all the aforesaid near-filed embodiments, fluorescent measurement applies and it helps to reduce background noise and enhance resolution. Since an excitation light has to be blocked in fluorescence measurement, NOM setup is modified with a filter added.

A NOM PD array can be arranged in various patterns. For example, central part of the array may have smaller and denser PDs for subwavelength or deep subwavelength resolution, while the rest PDs, which surround the central part and serve the purpose of identifying and locating a sample roughly and don't need to provide high resolution, may have larger PDs and be less densely arranged.

Aforesaid probe arrays can have curved surface besides a flat one, because in subwavelength investigation, gentle surface curving has little effect on measurement result. Thus, probe array surface may have a non-flat shape which is specially designed to assist sample handling.

Two probe-array NOMs may be used together in one measurement. The probe array surfaces may be arranged to sandwich a sample, generating near-field subwavelength-resolution images from two directions simultaneously.

Lastly, micro-channels used to convey solution and bio samples may be built on a surface of NOM probe array, where the probe array surface may be part of a channel structure. Consequently, flow of solution or sample can be monitored conveniently.

Therefore the scope of the invention should be determined by the appended claims and their legal equivalents, rather than by the examples given.

The invention claimed is:

1. A method for sensing a sample using light having a predetermined wavelength, comprising:
   1) disposing a detector array comprising a plurality of optical detectors, said detectors each including a sensing region for detecting a light signal and a detector aperture for receiving said signal, said detector aperture having a center, said array being arranged such that the size of the detector apertures is smaller than said wavelength and the distance between the centers of two of the detector apertures which are side by side is smaller than said wavelength;
   2) disposing said sample such that said sample is substantially proximate to a plurality of the apertures;
   3) illuminating said sample by said light for producing said signal; and
   4) sensing said signal from said sample by said detectors respectively.

2. The method according to claim 1, further including manipulating said sample by employing electrical, mechanical, or biochemical means separately or jointly.

3. The method according to claim 1, further including generating an image of said sample using said signal sensed by said detectors respectively.

4. The method according to claim 1 wherein said illuminating step includes disposing a plurality of source apertures for emitting said light, said source apertures each arranged substantially proximate to at least one of said detector apertures.

5. The method according to claim 1, further including processing said signal, said processing step comprising filtering said signal.

6. An optical apparatus comprising a detector array for measurements using light, said array comprising a plurality of optical detectors, said detectors each including:
   1) a detector aperture having a center, said detector aperture arranged such that its dimension is smaller than the wavelength of said light; and
   2) a sensing region for detecting a light signal which is transmitted to said sensing region via said detector aperture, said detector aperture and said sensing region arranged such that said detector aperture is in substantial proximity to said sensing region;
   said array arranged such that the distance between the centers of two of the detector apertures which are side by side is smaller than said wavelength.

7. The apparatus according to claim 6 wherein said detector apertures are arranged to be integrated together.

8. The apparatus according to claim 6 wherein said light includes a plurality of evanescent waves.

9. The apparatus according to claim 6, further including a mechanism for processing said signal, said mechanism comprising filter means for filtering said signal.

10. The apparatus according to claim 6, further including a plurality of source apertures for emitting said light, said source apertures each arranged substantially proximate to at least one of said detector apertures.

11. An optical apparatus comprising:
    1) a plurality of detector apertures, said detector apertures arranged to face the same direction for receiving light signals respectively;
    2) a plurality of source apertures, said source apertures each arranged to be substantially proximate to and side-by-side to at least one of said detector apertures and to emit emission light respectively; and
    3) a plurality of optical detectors, said detectors each arranged for sensing said signals which pass through said apertures respectively;
    4) said apparatus arranged such that the size of said detector apertures and said source apertures is smaller than the wavelength of said emission light and the distance between the centers of at least two of said source apertures is smaller than said wavelength.

12. The apparatus according to claim 11 wherein the distance between the centers of at least two of said detector apertures is smaller than said wavelength.

13. The apparatus according to claim 11, further including a plurality of light generating regions for generating said emission light respectively, said regions each arranged in substantial proximity to one of said source apertures respectively.

14. The apparatus according to claim 11 wherein said detector apertures and said source apertures are arranged to be integrated together.

15. The apparatus according to claim 11, further including a mechanism for processing said signals respectively, said mechanism comprising means for filtering said signals.

16. An optical apparatus comprising:
    1) at least a detector aperture, said detector aperture arranged to receive signal light which is transmitted through said detector aperture;
    2) at least a source aperture, said source aperture arranged to emit emission light, said detector and said source aperture disposed at different places, said detector and said source aperture arranged facing the same direction; and
    3) at least an optical detector, said detector arranged to be in substantial proximity to said detector aperture for sensing said signal light;
    4) said apparatus arranged such that the size of said detector and said source aperture is smaller than the wavelength of said signal light or said emission light and the distance between the centers of said detector and said source aperture is smaller than the wavelength of said signal light or said emission light.

17. The apparatus according to claim 16, further including a light generating region for generating said emission light, said region arranged in substantial proximity to said source aperture.

18. The apparatus according to claim 16 wherein said detector aperture and said detector are arranged to be integrated together.

19. The apparatus according to claim 16 wherein said detector aperture and said source aperture are arranged to be integrated together.

20. The apparatus according to claim 16, further including a mechanism for processing said signal light, said mechanism comprising filtering means for filtering said signal light.

* * * * *